Oct. 16, 1962    W. C. ROGERS    3,059,047
AIRCRAFT ANTENNA LEAD-THROUGH INSULATOR UNIT
Filed July 13, 1961
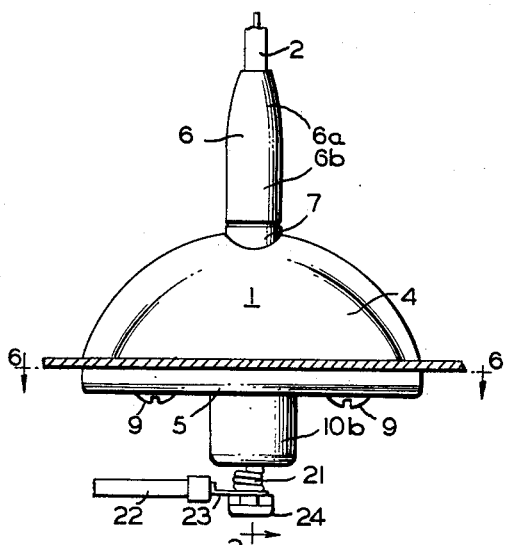
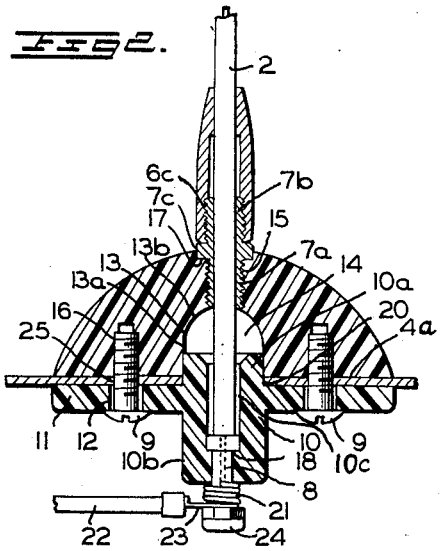
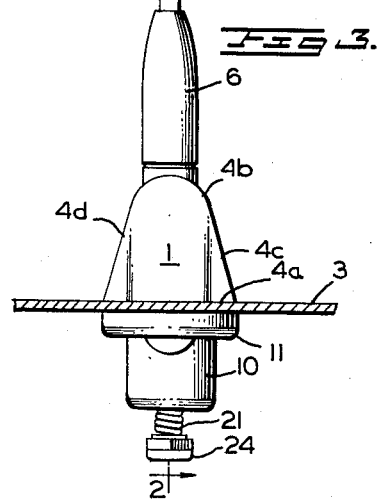
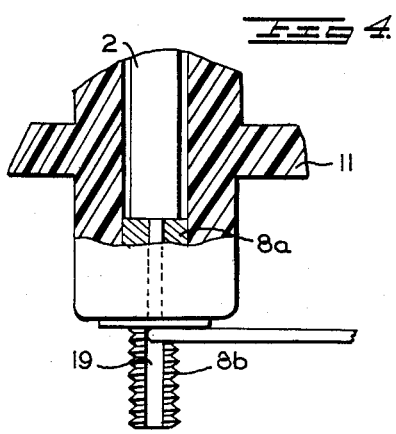
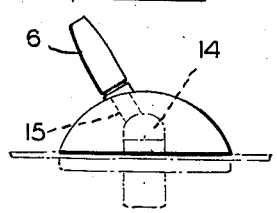
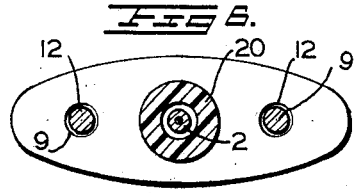
INVENTOR
WILLIAM C. ROGERS
BY
Burns, Doane, Benedict, Swecker & Mathis
ATTORNEYS

United States Patent Office 3,059,047
Patented Oct. 16, 1962

3,059,047
AIRCRAFT ANTENNA LEAD-THROUGH
INSULATOR UNIT
William C. Rogers, 5365 NW. 36th St.,
Miami Springs, Fla.
Filed July 13, 1961, Ser. No. 123,828
4 Claims. (Cl. 174—153)

This invention relates to an insulator unit adapted to lead an antenna wire through an aircraft wall.

In aircraft antenna installations, insulator units are required for feeding exteriorly disposed antenna wires through aircraft walls and into aircraft interiors. Such units, to be effective, must electrically insulate the antennas from the conductive walls of the aircraft and, in addition, must functions as seals to prevent the ingress of moisture into the aircraft through the aircraft wall opening which receives the antenna wire.

While a variety of lead-through insulator units have heretofore been made available, they have in general been characterized by a variety of structural and operational defects. Frequently, they have been found to be inefficient as sealing units. Because of the exposed ends of fastener elements, substantial corona discharge effects have resulted. Because of structural complexity, their installation has proven to be tedious and the frequency of mechanical failure unduly high. In many instances, the adjusting of the terminal position of an antenna wire in its secured position within insulator units has been found to be difficult, particularly subsequent to the initial installation. Because of the overall configuration of these units, insulation has proven to be especially awkward on curved aircraft wall surfaces.

The generally bulky nature of the structure of the previously employed units owing to the materials employed in their fabrication has caused excessive air drag to the extent of influencing substantial and detrimental vibration.

Recognizing the distinct need for an improved lead-through insulator unit, it is an object of this invention to provide such a unit which affords adequate support for the terminus of an antenna wire, effectively safeguards against corona discharge, and efficiently seals the aircraft wall aperture through which the wire terminus passes.

It is a further object of the invention to provide such an insulator unit which is characterized by ease of installation even on curved aircraft walls and which enables convenient adjustment of the aircraft wire terminus even after the initial installation of the unit.

It is an additional object of the invention to provide an aircraft lead-through insulator unit in which the number of structural elements are minimized so as to reduce the likelihood of parts failure and the attendant maintenance and in which, because of the configuration of the exposed components and the materials from which they are fabricated, there is achieved a structure of nominal size and presenting minimum air resistance.

To achieve the foregoing objects, there is contemplated an insulator unit for leading an antenna wire through an aircraft wall which includes a dielectric base member, a dielectric cover member and a metallic wire receiving and stabilizing nozzle. The base member has a centrally located, smooth walled tubular body and a flange integral with this body. The flange extends radially from a point intermediate the body ends so as to provide body portions projecting transversely from opposite sides of the flange and define base member elongate ends. The cover member also has oppositely extending elongate ends and is characterized by a flat base surface and a curved outer surface projecting upwardly therefrom. A first cover member recess extends transversely inwardly from the central portion of the cover member base surface and terminates within the cover member. The portion of the first recess adjacent the base surface is smooth walled and cylindrical in character, of substantially the same diameter as the tubular body of the base member and of greater length than one of the body portions projecting from the base member. A second cover member recess extends transversely inwardly from the outer surface of the cover member to intersect the first recess. A metallic, wire receiving and stabilizing nozzle is mounted on the cover member to project axially outwardly from the second recess. The nozzle has a constricted wire receiving end which gradually enlarges to merge smoothly with a cylindrical portion. In the other of the projecting body portions of the base member, a terminal means is mounted for securing the end of an antenna wire extending from the cover member first recess. A transverse aperture is formed in each elongate end of the base member flange and, corresponding to these flange apertures, closed end recesses are formed in each elongate end of the cover member to extend transversely inwardly of the cover member base surface.

To install the insulator unit, an antenna wire terminus is threaded through the nozzle, the second and first cover member recesses, and into the terminal means of the base member. With the base and cover members positioned on opposite sides of an aircraft wall, and the one projecting body portion of the base member passing through the wall into the cylindrical portion of the first cover member recess, the cover member base surface and the opposing face of the base member flange may be drawn into sealing engagement with opposite sides of the wall by threaded fasteners extending through the flange apertures and the aircraft wall into the closed end cover member recess.

Having described the invention generally, its structural details will now be delineated with reference to the preferred embodiment illustrated in the accompanying drawings in which:

FIGURE 1 is a side elevational view of an installed insulator unit,

FIGURE 2 is a sectional view of an installed unit taken along the line 2—2 of FIGURE 3, FIGURE 3 is an end elevational view of an installed unit, FIGURE 4 is an enlarged partially sectional view of a portion of the base tubular body and wire securing terminal of the unit, FIGURE 5 is a plan view of a modified insulator unit including an inclined wire receiving nozzle, and FIGURE 6 is a sectional view of the base member flange of the unit taken along the line 6—6 of FIGURE 1.

In FIGURES 1 and 2 there is illustrated an insulator unit 1 feeding an antenna wire 2 through an aircraft wall 3.

As shown in the sectional view of FIGURE 2, the insulator unit includes a cover member 4, a base member 5, a wire receiving nozzle 6, a coupling member 7, a terminal 8, and threaded fasteners 9. Nozzle 6 is fabricated from a metallic, electrically conducting material, preferably aluminum. Both cover member 4 and base member 5 are dielectric and fabricated from a high tensile strength, slightly yieldable plastic such as nylon.

Base member 5 includes a centrally located tubular body 10 having a smooth walled exterior. Integral with body 10 and, extending radially therefrom at a point intermediate its end, is flange 11 providing oppositely extending elongate ends for the base member. Compared to the length of body 10, flange 11 is thin. As shown in the FIGURE 6 sectional view, the flange periphery is smoothly rounded so as to resemble an elongated ellipse. The flange width is substantially less than its longitudinal length so as to impute to the flange a comparatively narrow character. In each end of flange 11 there is formed a transversely extending aperture 12 through which a fastener 9 extends.

The intersection of flange 11 with tubular body 10 defines upper body portion 10a and lower body portion 10b projecting transversely from opposite sides of the flange. Extending axially through body 10 is bore 10c which receives the antenna wire 2.

The dielectric cover 4, as illustrated in FIGURES 1 and 3, has a generally semi-circular side elevational configuration. Cover 4 includes a flat, base surface 4a, a concave rim 4b, and smooth, laterally curved side walls 4c and 4d projecting upwardly from base surface 4a to merge smoothly with curved rim 4b. Base surface 4a is complementary with the configuration of base flange 11 so as to provide oppositely extending elongate ends.

Cover 4 includes a number of recesses extending inwardly from its outer surfaces. Centrally, in the base of the cover, a first recess 13 is formed which includes a smooth walled cylindrical portion 13a transverse to and adjacent the base surface and of substantially the same diameter as the body 10 of base member 5. As illustrated, recess 13 terminates in a hemispherical end portion 13b well within the interior of cover 4. The length of cylindrical portion 13a is at least as great as the length of the upper projecting body portion 10a so as to be able to receive this portion regardless of the thickness of wall 3. Because of this and the hemispherical recess end, a substantial cavity 14 will always be formed between the end of the portion of body 10 received in recess 13 and the upper end of this recess.

A second recess 15 extends transversely inwardly from the rim surface 4b to intersect the upper end or terminal portion of recess 13. The axis of second recess 15 is coplanar with the longitudinal median plan of the insulator unit so as to be coplanar with the axis of the first recess 13.

Extending transversely inwardly from the base surface 4a, in the elongated end portions of cover 4, are closed end recesses 16. Recesses 16 are positioned to conform to the positioning of apertures 12 in the elongate ends of base flange 11 and are intended to receive the threaded portions of fasteners 9 passing through the flange apertures and aircraft wall into the cover 4.

Nozzle 6 is designed to receive, support, and stabilize the antenna wire 2 entering the insulator unit 1. The nozzle is characterized by a constricted wire receiving end 6a which enlarges gradually to smoothly merge with a cylindrical portion 6b having an internally threaded portion 6c.

The coupling 7 is employed to detachably mount the nozzle 6 on cover 4. Coupling 7, which is generally tubular in character, includes a first, externally threaded, mandrel portion 7a which is threadably engaged with the wall of recess 15. A second, externally threaded, mandrel portion 7b projects upwardly to receive internally threaded portion 6c of nozzle 6. An annular abutment 7c, positioned between mandrel portions 7a and 7b, is of the same diameter as the cylindrical end of nozzle 6 so as to provide a peripherally conforming stop for the nozzle 6. By engagement with seat 17 in recess 15, abutment 7c positively positions coupling 7 in recess 15.

In bore 10c, in the lower projecting portion 10b of the tubular body 10 of base member 5, there is formed an annular abutment 18. Abutment 18 defines a stop limiting outward movement of terminal 8 from the interior of body 10.

As shown in the enlarged, partial sectional view in FIGURE 4, terminal 8, which is generally tubular in character, includes an enlarged head portion 8a and an externally threaded coupling portion 8b. Extending longitudinally inward from the threaded coupling end of terminal 8 is a slot 19 which intersects the terminal tubular wall. The upper portion of bore 10c is of sufficient size to slidably accommodate head portion 8a. This bore is restricted beneath abutment 18 but is of such diameter as to slidably receive the threaded and longitudinally slotted coupling portion 8b of terminal 8. Thus, by inserting the coupling portion of terminal 8 into the relatively large opening in the upper projecting portion 10a of body 10, the coupling portion may be passed through the restricted portion of bore 10c to project from the lower end of lower projecting portion 10b. Because of the engagement of the lower surface of the enlarged head portion 8a and the abutment 18, complete passage of the terminal 8 through the body 10 is prevented.

To install the insulator 1, the end of antenna wire 2 is threaded through nozzle 6 and coupling member 7 lined recess 15 of cover 4 into recess 13. The wire is then passed through an aperture 20 in aircraft wall 3 into the bore 10c in the upper projecting end 10a of body 10 of base member 5. As shown in FIGURE 4, the antenna wire end has been stripped of insulation so as to pass freely through the axial passage in terminal 8. The slot 19 is of sufficient width to allow the end of the antenna wire to be bent outwardly at right angles from the terminal passage to the terminal exterior such that it may be secured by winding about the threaded portion 8b as shown at 21 in FIGURE 2. A connecting lead 22 may be electrically connected to the end of the antenna wire 2 by means of an apertured connecting clip 23 inserted over the end of coupling portion 8b of the terminal and held in place against the wound end 21 of the antenna wire by a lock nut 24.

Either prior or subsequent to the securing of the end of the antenna wire, the base 5 and cover 4 may be interconnected on opposite sides of aircraft wall 3. In being installed, of course, the base and cover will be longitudinally aligned with the aircraft so as to present minimum air resistance. As the aircraft walls in which the unit will be mounted are usually curved about the longitudinal axis of the aircraft, the unit will be oriented such that its narrow dimension extends in the direction of bending so as to minimize the problem of conforming the unit to the configuration of the wall. In assembling the cover and base, fastenings 9 are inserted through base flange apertures 12 to pass through corresponding aircraft wall apertures 25 into the closed end cover recesses 16. Fasteners 9 are secured by being threadably advanced into these recesses to draw the base face of the cover 4 and the upper or opposing face of the flange 11 into sealing engagement with opposite sides of the wall 3. During the initial assembly stage, the upper projecting body portion 10a may be passed through the corresponding wall aperture 20 to extend into the cylindrical portion 13a of recess 13 so as to coaxially align the base and cover. Following this initial alignment, by merely inserting one fastener 9 through one flange aperture 12 into one cover recess 13, the remaining flange aperture and cover recess 16 will be automatically placed in coaxial alignment to facilitate the insertion of the remaining fastener 9.

Because of the inclination of the received end of the antenna wire, it may be necesary to incline the recess 15 and the axially projecting nozzle 6 as shown in FIGURE 5. Under such circumstances, the cavity 14 between recess 15 and the upper end of projecting body portion 10a affords ample room and freedom for a bend in the end of the antenna wire which would be required to orient the end with the axis of the bore 10c in body 10 of the base. Thus, cavity 14 provides an area of freedom within which the antenna wire may be manipulated to pass from cover recess 15, lined by coupling 7, into the axially extending opening 10c in tubular body 10.

In describing the structure of the insulator unit of this invention, its significant functional advantages have been manifested. The uppermost projecting portion of the tubular body of the base member enables coaxial alignment of the base and cover members during installation of the unit. The narrow elongate character of the flange and cover facilitate installation of the unit on the curved aircraft surfaces through the alignment of the long dimension of the unit with the bending axis of the wall surface.

The structure of the unit components and the material from which it is fabricated provides a number of effective seals. The slightly yieldable charactered of the nylon material from which the base and cover are fabricated contributes toward effective sealing action between the cover base surface and the outer surface of an aircraft wall as well as between the upper surface of the flange and the inner surface of the aircraft wall. The high tensile and shear strength of nylon enables the base member when secured by the threaded fasteners to provide effective seals not only in the vicinity of the fasteners but in the area of the wire receiving wall aperture as well. The upper projecting character of the body prevents leakage through the tubular body of moisture which by chance may have seeped between an incompletely secured cover and an outer aircraft surface. The snug fit between the upper projecting tubular body portion of the base member and the cylindrical recess in the base of the cover further contributes to this sealing action. The nozzle receiving mandrel portion of the coupling similarly precludes the entry of moisture from the outer surface of the cover through the wire receiving recess.

The unique arrangement of the fasteners and the wire supporting nozzle contribute to the reduction of corona discharge. In terminating entirely within the cover, the fasteners present no sharp points which tend to effect corona discharges. The highly conductive character of the cap in conjunction with its substantial surface area, provides a highly conductive, large surface area path for conductive surface charges carried on the antenna wire to the cover of the insulator unit so as to avoid discharge at the wire and cover junction.

The use of nylon and aluminum as fabrication materials for the insulator unit constitutes a significant advance over prior art structures fabricated from relatively weak materials such as polyethylene and brittle ceramic structures. As a result, the overall dimensions of the unit may be materially reduced so as to minimize surfaces creating air drag and inducing vibration. Of further significance in this respect is the narrow elongate character of the unit which enables it to be oriented longitudinally with the aircraft so as to present a minimum frontal or drag creating area.

From a fabrication standpoint, the cavity provided in the central base recess of the cover is of material consequence. Because of the cavity, it is not necessary to achieve precise alignment of the wire receiving recess in the cover and the wire receiving recess in the tubular body of the base member. As a result, the wire receiving recess may be inclined substantially in the manner shown in FIGURE 5 without necessitating any changes in the cover structure except the positioning of this recess.

The lower projecting tubular body portion of the base member provides a readily accessible housing for the terminal and, in displacing the terminal from the cover, considerably reduces the size of the cover.

The feed through, slotted terminal is of particular utility in enabling minor adjustments of the antenna wire terminus position. The cleaned end of the wire may be pulled through the terminal 8 until the proper antenna wire slack is achieved and then secured in place by being wrapped around the projecting coupling portion of the terminal. Subsequent to the initial installation, the wire terminus may be completely released for removal of the antenna wire or for readjusting the position of the wire terminus without disengaging the base and cover members. In addition, this terminal is of such structural simplicity as to virtually eliminate parts failure or other maintenance problems.

While the invention has been described with reference to a preferred embodiment of an aircraft insulator unit, its overall scope is deemed to be defined in the appended claims.

I claim:
1. An insulator unit for leading an antenna wire through an aircraft wall, said unit comprising: a dielectric base member, said base member having a centrally located, smooth walled, tubular body and a relatively thin, elongate flange integral with said body and extending radially from a point intermediate the ends thereof so as to provide body portions projecting transversely from opposite sides of said flange and define base member elongate ends; a dielectric cover member, having oppositely extending, elongate ends, said cover member having a flat base surface, a curved outer surface projecting therefrom, a centrally located, first recess extending transversely inwardly from said cover base surface, terminating within said cover member, having a smooth walled, cylindrical portion adjacent said base surface of substantially the same diameter as said tubular body and of greater length than one of the body portions projecting from said base member, and a second recess extending transversely inwardly from the outer surface of said cover member to intersect said first recess; a metallic, wire receiving and stabilizing nozzle mounted on said cover member to project axially outwardly from said second recss, said nozzle having a constricted wire receiving end gradually enlarging to merge smoothly with a cylindrical portion; terminal means mounted in the other of said projecting body portions of said base member to secure the end of an antenna wire extending from said cover member first recess; a transverse aperture in each elongate end of said base member flange; a closed end recess in each elongate end of said cover member extending transversely inwardly of said cover member base surface and adapted to threadably receive a threaded fastener passed through a corresponding flange aperture, whereby, with said members positioned on opposite sides of an aircraft wall and said one projecting body portion passing through said wall into said cylindrical portion of said first recess, said cover member base surface and the opposing face of said base member flange may be drawn into sealing engagement with opposite sides of said wall by threaded fasteners extending through said flange apertures and aircraft wall into said closed end cover member recesses.

2. An aircraft insulator unit as described in claim 1 wherein said terminal means comprises a generally tubular member having an enlarged head portion at one end, a threaded coupling portion at the opposite end, and a peripheral slot intersecting the wall of said tubular member and extending from said opposite end longitudinally of said member; and wherein said other projecting body portion includes an annular, interiorly disposed abutment facing said one projecting portion such that the threaded and longitudinally slotted coupling portion of said member may be inserted in said one projecting portion of said tubular body and passed outwardly from said other projecting portion with said member being restrained from passing through said other portion by engagement of said enlarged head portion and said abutment.

3. An aircraft insulator unit as described in claim 1 wherein with said base member and cover member assembled on opposite sides of an aircraft wall, said first recess of said cover member provides a cavity between said one projecting body portion and said second recess.

4. An aircraft insulator unit as described in claim 1 and including a generally tubular coupling member for mounting said nozzle on said cover member, said coupling member including a first, externally threaded, mandrel portion threadably secured within said second cover member recess and a second, externally threaded, mandrel portion; and said nozzle cylindrical portion being internally threaded for threaded engagement with said second mandrel portion.

References Cited in the file of this patent
UNITED STATES PATENTS

| Re. 23,310 | Eriksen et al. | Dec. 19, 1950 |
| 2,668,187 | Von Wald et al. | Feb. 2, 1954 |